US006712389B2

United States Patent
Mauleon

(10) Patent No.: US 6,712,389 B2
(45) Date of Patent: Mar. 30, 2004

(54) AIR BAG WITH TETHER

(75) Inventor: Hector Javier Zarazua Mauleon, Rochester Hills, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 92 days.

(21) Appl. No.: 10/061,603

(22) Filed: Feb. 1, 2002

(65) Prior Publication Data

US 2003/0146614 A1 Aug. 7, 2003

(51) Int. Cl.$^7$ .............................................. B60R 21/16
(52) U.S. Cl. ................... 280/743.2; 280/730.2
(58) Field of Search ........................ 280/743.2, 730.2, 280/743.1, 730.1

(56) References Cited

U.S. PATENT DOCUMENTS

| | | | |
|---|---|---|---|
| 3,907,327 A | * 9/1975 | Pech | 280/729 |
| 5,378,019 A | 1/1995 | Smith et al. | |
| 5,464,250 A | * 11/1995 | Sato | 280/743.1 |
| 5,489,119 A | * 2/1996 | Prescaro et al. | 280/743.2 |
| 5,588,672 A | * 12/1996 | Karlow et al. | 380/730.2 |
| 6,010,149 A | * 1/2000 | Riedel et al. | 280/730.2 |
| 6,135,490 A | * 10/2000 | Spary | 280/730.2 |
| 6,152,481 A | * 11/2000 | Webber et al. | 280/730.2 |
| 6,170,871 B1 | * 1/2001 | Goestenkors et al. | 280/743.1 |
| 6,176,515 B1 | * 1/2001 | Wallner et al. | 280/730.2 |
| 6,390,502 B1 | * 5/2002 | Ryan et al. | 280/743.2 |
| 6,422,593 B1 | * 7/2002 | Ryan | 280/730.2 |
| 6,457,745 B1 | * 10/2002 | Heigl | 280/743.2 |
| 6,505,853 B2 | * 1/2003 | Brannon et al. | 280/730.2 |

FOREIGN PATENT DOCUMENTS

| | | |
|---|---|---|
| DE | 298 19 999 | 5/1999 |
| JP | 5124480 | 5/1993 |

OTHER PUBLICATIONS

Co–pending U.S. patent appln. Ser. No. 09/436,868, filed Nov. 9, 1999 entitled "Gas Bag with Tether Means".

* cited by examiner

Primary Examiner—Paul N. Dickson
Assistant Examiner—Deanna Draper
(74) Attorney, Agent, or Firm—Tarolli, Sundheim, Covell & Tummino L.L.P.

(57) ABSTRACT

An inflatable vehicle occupant protection device (10) includes first and second panel portions (12, 14) each having a plurality of discrete openings (44, 54). The first panel portion (12) overlies the second panel portion (14) when the device (10) is in the deflated condition. A tether (30) interconnects the first and second panel portions (12, 14). The tether (30) includes a single thread (60) extending through the plurality of openings (44) in the first panel portion (12) and through the plurality of openings (54) in the second panel portion (14) in a serpentine manner. The single thread (60) has loop thread portions located outside the inflation fluid volume (16). The panel portions (12, 14) move relative to the single thread (60) as the device (10) is inflated from the deflated condition to the inflated condition. Preferably, stop members (120, 122) on the end portions (62, 64) of the tether (30) block movement of the end portions through the openings (44, 54) in the panel portions (12, 14).

6 Claims, 4 Drawing Sheets

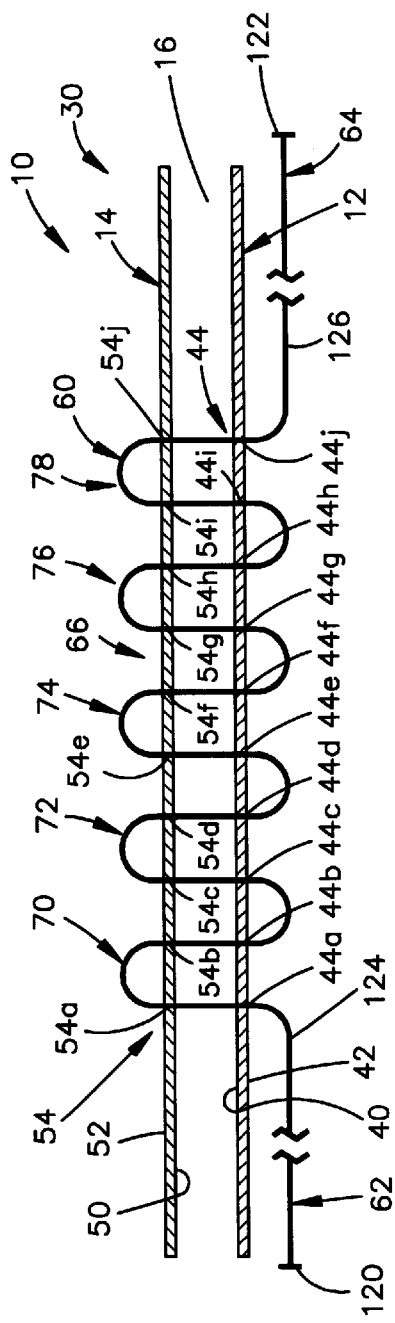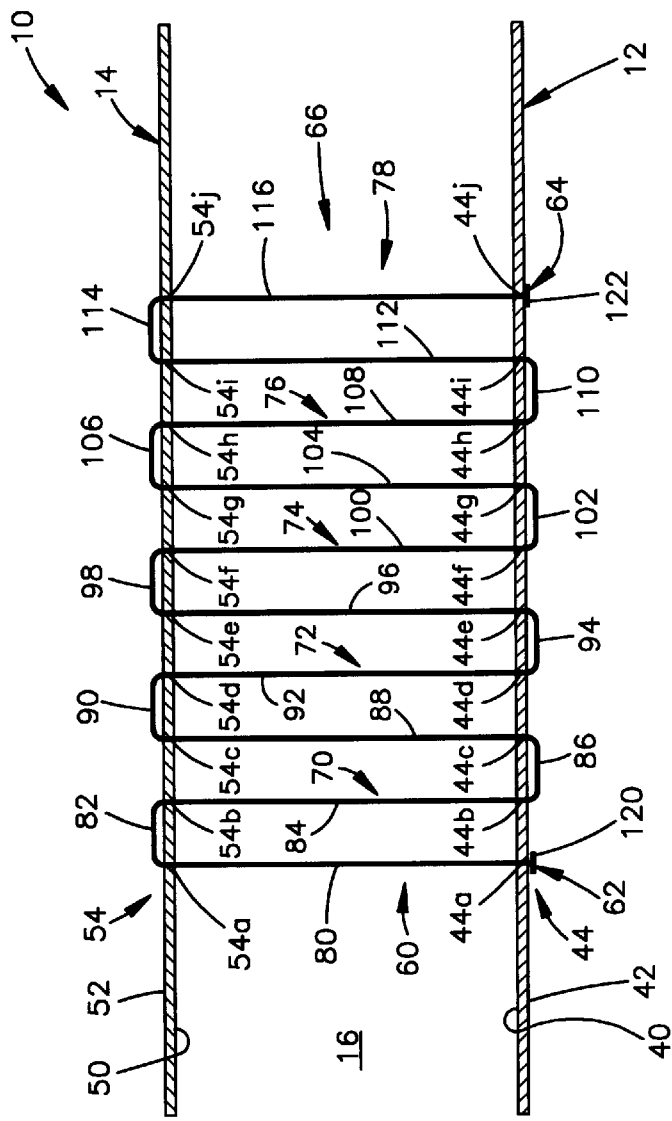

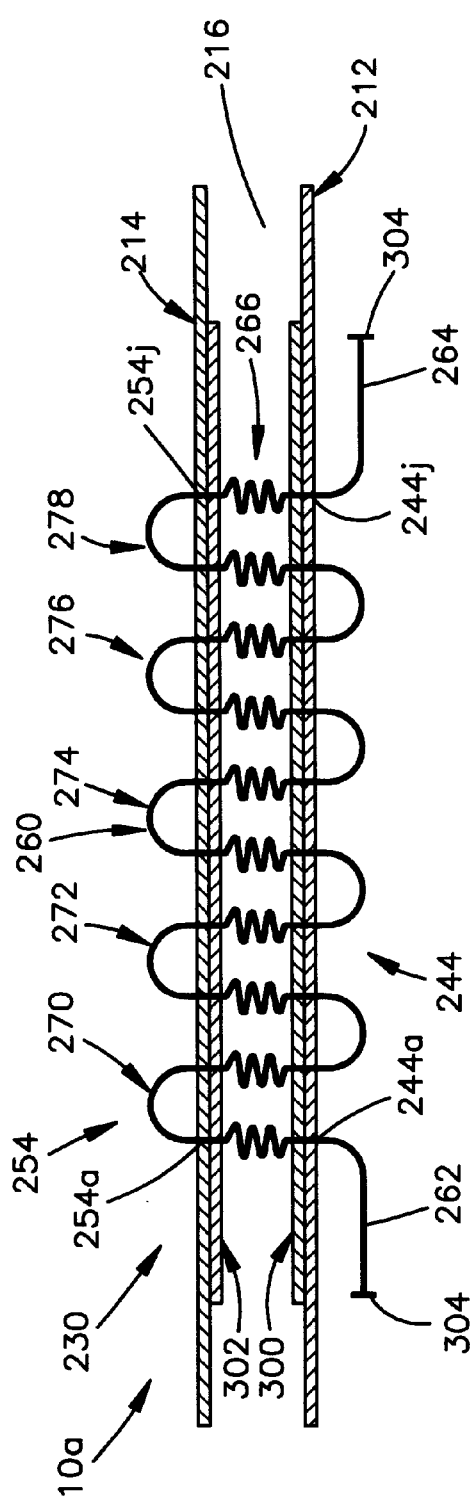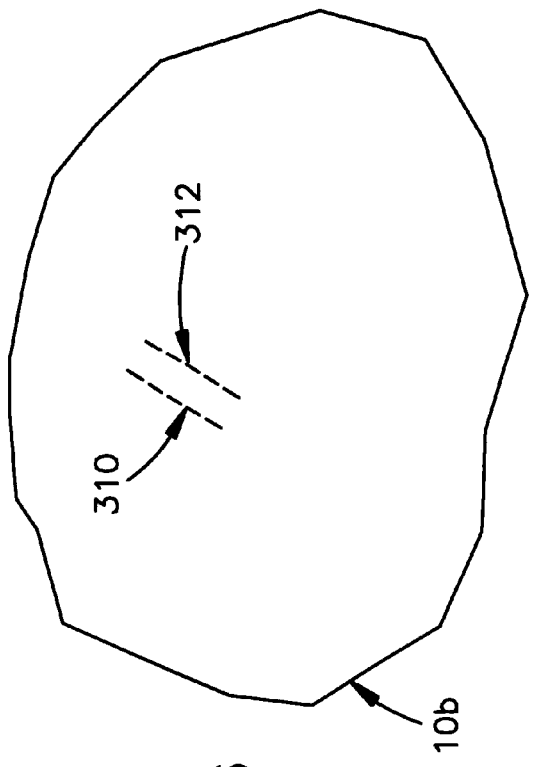

AIR BAG WITH TETHER

BACKGROUND OF THE INVENTION

1. Technical Field

The present invention relates to a vehicle occupant protection apparatus. In particular, the present invention relates to an air bag that includes a tether for controlling the direction and amount of inflation of the air bag.

2. Description of Related Art

It is known to provide an air bag with an internal tether. The tether is connected between two portions of the air bag. When the air bag inflates to a first volume, the tether limits or controls relative movement of the two portions the air bag. This helps to control the movement of the air bag portions and thus helps to control the direction and amount of inflation of the air bag.

German Gebrauchsmuster DE 298 19 999 U1 discloses an air bag having two panels joined by a seam that includes a slack thread. When the air bag inflates, the thread extends between the panels and acts as a tether.

SUMMARY OF THE INVENTION

The present invention is an inflatable vehicle occupant protection device for helping to protect an occupant of a vehicle. The device is inflatable from a deflated condition to an inflated condition by inflation fluid from an inflation fluid source. The device comprises flexible material defining an inflation fluid volume for receiving inflation fluid, including a first panel portion and a second panel portion. The first panel portion has a plurality of discrete openings, and the second panel portion also has a plurality of discrete openings. The first panel portion overlies the second panel portion when the device is in the deflated condition. A tether interconnects the first panel portion and the second panel portion. The tether includes a single thread extending through the plurality of openings in the first panel portion and through the plurality of openings in the second panel portion in a serpentine manner. The single thread has loop thread portions located outside the inflation fluid volume.

The first panel portion is spaced apart from the second panel portion when the device is in the inflated condition with the tether extending between the first and second panel portions to limit movement of the first panel portion away from the second panel portion. The panel portions move relative to the single thread as the device is inflated from the deflated condition to the inflated condition.

In a preferred embodiment, the tether includes a first stop member on the first end portion of the tether and a second stop member on the second end portion of the tether for blocking movement of the end portions of the tether through the openings in the portions upon movement of the first panel portion away from the second panel portion.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 2 is an enlarged schematic illustration of a portion of the air bag of FIG. 1 showing the tether in an unextended condition;

FIG. 3 is a view similar to FIG. 2 showing the tether in an extended condition;

FIG. 4 is a view similar to FIG. 2 showing a tether in accordance with a second embodiment of the invention, in an unextended condition;

FIG. 6 is a view of a portion of an air bag in accordance with a third embodiment of the invention including two adjacent tethers.

DETAILED DESCRIPTION OF THE INVENTION

Figure 1:
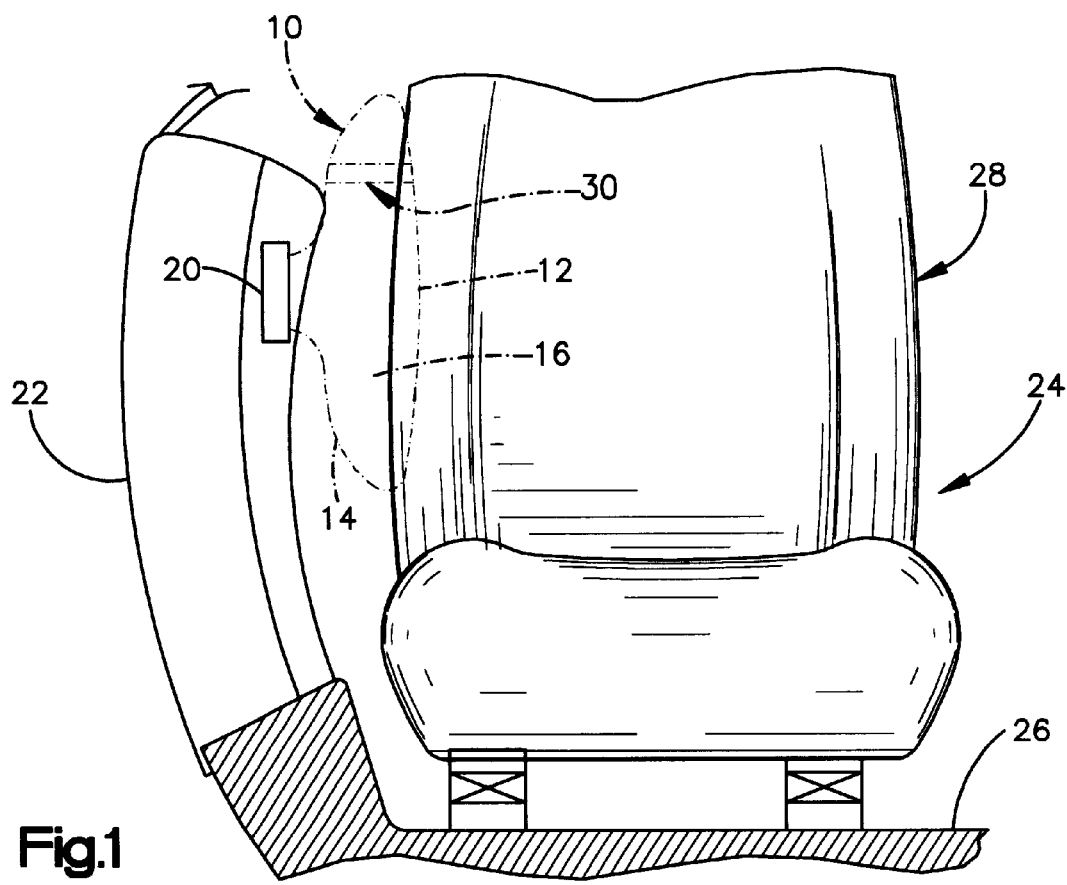
FIG. 1 is a front elevational view of a portion of a vehicle including a vehicle seat and an adjacent door-mounted occupant protection apparatus including an air bag with a tether in accordance with the present invention.

The present invention relates to a vehicle occupant protection apparatus. In particular, the present invention relates to an air bag that includes a tether for controlling direction and amount of inflation of the air bag. As representative of the present invention, FIG. 1 illustrates an inflatable vehicle occupant protection device in the form of an air bag 10. Other inflatable vehicle occupant protection devices that can be used in accordance with the invention include, for example, inflatable seat belts, inflatable knee bolsters, inflatable head liners, inflatable side curtains, and knee bolsters operated by inflatable air bags.

The air bag 10 is preferably made from a flexible fabric material, such as woven nylon. The air bag 10 can alternatively be made from a non-woven material, such as plastic film.

The air bag 10 includes a first panel portion 12 and a second panel portion 14. The panel portions 12 and 14 may be separate pieces of material that are sewn or otherwise joined together, or may be different portions of a single piece of material. The panel portions 12 and 14 at least partially define an inflation fluid volume 16 in the air bag 10.

The air bag 10 is associated with an inflator 20, and both are mounted in a door 22 of a vehicle 24. The inflator 20 preferably contains a stored quantity of pressurized inflation fluid and an ignitable material for heating the inflation fluid. The inflator 20 could alternatively use the combustion of gas-generating material to generate inflation fluid in the form of gas to inflate the air bag 10, or contain only a stored quantity of pressurized inflation fluid for inflating the air bag.

A body 26 of the vehicle 24 supports a seat 28, illustrated as a front passenger seat of the vehicle, adjacent to the inflator 20. The inflator 20 is actuatable in a known manner to inflate the air bag 10 to help protect an occupant of the seat 28 in the event of a side impact to the vehicle 24.

It should be understood that the present invention is applicable to an air bag 10 that is mounted in another vehicle location to help protect against a side impact, such as a head rest, a seat, a roof rail, or a B-pillar of the vehicle 24. It should also be understood that an air bag 10 in accordance with the present invention can be other than a side impact air bag, for example, a frontal air bag.

In the event of a side impact to the vehicle 24, the inflator 20 is actuated in a known manner to direct inflation fluid into the inflation fluid volume 16 between the air bag panel portions 12 and 14. The pressure of the inflation fluid in the air bag 10 causes the first panel portion 12 to move in a direction away from the second panel portion 14 as the air bag assumes an inflated condition as shown in phantom in FIG. 1.

The air bag 10 includes a tether 30, described below in detail, for limiting movement of the first panel portion 12 away from the second panel portion 14. As this relative movement of the air bag panel portions 12 and 14 occurs, the tether 30 extends from the collapsed or unextended condition in which it is disposed when the air bag 10 is not inflated, to an extended condition. The tether 30, as it becomes fully extended as shown in FIG. 1, resists movement of the first panel 12 away from the second panel 14.

The first panel portion 12 (FIGS. 2 and 3) has inner and outer opposite side surfaces 40 and 42. The first panel portion 12 has a plurality or group 44 of discrete openings that extend through the first panel portion 12 between the inner and outer side surfaces 40 and 42. In FIGS. 2 and 3, the openings are individually identified with the reference numerals 44a–44j.

The openings 44a–44j as shown are formed by a sewing process, so there may in actuality be substantially more than or fewer than ten openings in a panel of an air bag 10 in accordance with the present invention. The openings 44a–44j are spaced apart from each other. As illustrated, the openings 44a–44j are in a straight line, but need not be. For example, the openings 44a–44j could be in a circular pattern, or in another pattern. In one embodiment, the openings 44a–44j are equally spaced apart by about 3 millimeters each.

The second panel portion 14 has inner and outer opposite side surfaces 50 and 52. The second panel portion 14 has a plurality or group 54 of discrete openings that extend through the second panel portion between the inner and outer side surfaces 50 and 52. In FIGS. 2 and 3, the openings are individually identified with the reference numerals 54a–54j. As described below, the openings 54a–54j are formed by sewing process, so there may in actuality be substantially more than or fewer than ten openings in a panel of an air bag 10 in accordance with the present invention. The number of openings 54a–54j in the second panel portion 14 is preferably the same as the number of openings 44a–44j in the first panel portion 12.

The openings 54a–54j in the second panel portion 14 are spaced apart from each other. In one embodiment, the openings 54a–54j are equally spaced apart by about 3 millimeters each. The pattern of the openings 54a–54j in the second panel portion 14 is the same as the pattern of openings 44a–44j in the first panel portion 12, because both sets of openings are formed at the same time, by the same sewing process.

The tether 30 joins the first and second panel portions 12 and 14 at the location of the openings 44 and 54. The tether 30 extends through the openings 44 and 54 in a serpentine manner.

Specifically, the tether 30 comprises a single thread 60 and is a single continuous length of material. The thread 60 may be an item that is of the type used for sewing together panels of fabric material. For example, the thread 60 may be a filament, a group of filaments twisted together, or a filamentous length formed by spinning and twisting short textile fibers into a continuous strand. Alternatively, the thread 60 may be a fine continuous strand made by plying two or more of these filament groups or lengths with a tight twist and smooth finish. The thread 60 may be made from the same material as the panel portions 12 and 14.

The thread 60 is connected with the first and second panel portions 12 and 14 by a sewing process. The first and second panel portions 12 and 14 are placed adjacent and overlying each other as shown in FIG. 2. (In FIG. 2, the panel portions 12 and 14 are, for clarity, shown separated from each other. They may be in abutting engagement with each other when the thread 60 is inserted, and in abutting engagement with each other when the air bag 10 is folded and stored in the vehicle 24.)

The thread 60 is extended through the first and second panel portions 12 and 14 with a needle or similar object (not shown). The needle forms the openings 44 and 54 in the first and second panel portions 12 and 14, respectively, while the needle is extending the thread 60 through the panel portions. Thus, as the needle is forced through the fabric material of the first panel portion 12, the needle forms the plurality of openings 44. As the needle is forced through the fabric material of the second panel portion 14, the needle forms the plurality of openings 54.

The thread 60 has first and second opposite end portions 62 and 64, and an intermediate portion 66 that extends between and interconnects the first and second end portions. When the thread 60 is extended through the first and second panel portions 12 and 14, the first end portion 62 of the thread is disposed on or adjacent the outer side surface 42 of the first panel portion. The second end portion 64 of the thread 60 is disposed on or adjacent the outer side surface 42 of the first panel portion 12. In another embodiment of the invention, the end portions 62 and 64 may be located elsewhere.

The intermediate portion 66 of the thread 60 forms a plurality of loops. In the illustration of FIGS. 2 and 3, five loops 70, 72, 74, 76 and 78 are formed.

The loop 70 includes a first leg 80 that starts at the thread end portion 62 and extends through the inflation fluid volume 16 from the opening 44a to the opening 54a. The loop 70 also includes a loop thread portion 82 that is disposed outside the inflation fluid volume 16, on or adjacent the outer side surface 52 of the second panel portion 14. The loop thread portion 82 extends from the opening 54a in the second panel portion 14 to the adjacent opening 54b in the second panel portion. The loop 70 also includes a second leg 84 that extends through the inflation fluid volume 16 from the opening 54b in the second panel portion 14 to the opening 44b in the first panel portion 12. The loop 70 finally includes a loop thread portion 86 that is disposed outside the inflation fluid volume 16, on or adjacent the outer side surface 42 of the first panel portion 12. The loop thread portion 86 extends from the opening 44b in the first panel portion 12 toward the adjacent opening 44c in the first panel portion.

Each one of the other loops 72–78 is similar in configuration to the loop 70. The loop 72 includes a part of the loop thread portion 86, a first leg 88, another loop thread portion 90, a second leg 92, and a part of yet another loop thread portion 94. The loop 74 includes a part of the loop thread portion 94, a first leg 96, another loop thread portion 98, a second leg 100, and a part of still another loop thread portion 102.

The loop 76 includes a part of the loop thread portion 102, a first leg 104, another loop thread portion 106, a second leg 108, and a part of another loop thread portion 110. The loop 78 includes a part of the loop thread portion 110, a first leg 112, another loop thread portion 114, and a second leg 116. The loop 78 terminates at the second end portion 64 of the thread 60.

The tether 30 includes stop members 120 and 122 on the end portions 62 and 64, respectively, of the thread 60. The stop members 120 and 122 are elements that prevent the end portions 62 and 64 of the thread 60 from being pulled through the openings 44 and 54 in the panel portions 12 and 14. In the embodiment illustrated in FIGS. 2 and 3, the stop members 120 and 122 are fabric pieces that are secured to the thread end portions 62 and 64, respectively. The fabric pieces 120 and 122 may be secured by sewing, or adhesive, or melting and bonding, or in any other suitable manner.

When the air bag 10 is in the folded and deflated condition, the first panel portion 12 overlies the second panel portion 14, as shown in FIG. 2. The thread 60 is tightly looped through the plurality of openings 44 in the first panel portion 12 and through the plurality of openings 54 in the second panel portion. There is little or no slack in the part of the thread 60 disposed within the inflation fluid volume 16, between the panel portions 12 and 14. Thus, the loops 70–78 are relatively short.

In contrast, there is a substantial amount of slack in the part of the thread 60 that is disposed outside of the inflation fluid volume 16. This part includes the first and second end portions 62 and 64 of the thread 60, which are relatively long when the air bag 10 is in this condition. The thread 60 has a first length of slack 124 at the first end portion 62 and a second length of slack 126 at the second end portion 64. Substantially all the slack in the thread 60 is disposed outside of the first and second panel portions 12 and 14, and outside of the inflation fluid volume 16, when the air bag 10 is in the deflated condition.

When the air bag 10 is inflated, the first and second panel portions 12 and 14 move away from each other, from the condition shown in FIG. 2 to the condition shown in FIG. 3. As this relative movement occurs, the tether 30 moves from the unextended condition shown in FIG. 2 to the extended condition shown in FIG. 3.

The intermediate portion 66 of the thread 60 of the tether 30 pulls through the openings 44a–44j in the first panel portion 12 and through the openings 54a–54j in the second panel portion 14. The loops 70–78 of the thread 60 become much longer, and the end portions 62 and 64 of the thread become much shorter.

As the thread 60 is pulled through the openings 44a–44j in the first panel portion 12, the thread 60 engages the material of the first panel portion around the openings. The friction between the thread 60 and the material of the first panel portion 12 resists movement of the thread through the openings 44a–44j, as a shoelace resists being pulled out of the lacing openings in a shoe, for example.

Similarly, as the thread 60 is pulled through the openings 54a–54j in the second panel portion 14, the thread engages the material of the second panel portion around the openings. The friction between the thread 60 and the material of the second panel portion 14 resists movement of the thread through the opening 54a–54j. The friction of the thread 60 moving through the panel portions 12 and 14 thus slows down the movement of the first panel portion away from the second panel portion.

The legs of the loops 70–78 are pulled taut by the force applied by the inflation fluid in the inflation fluid volume 16 between the panel portions 12 and 14. The first stop member 62 engages the outer side surface 42 of the first panel portion 14, at the location of the opening 44a. This engagement blocks movement of the first end portion 62 of the thread 60 through the opening 44a. The second stop member 64 engages the outer side surface 42 of the first panel portion 14, at the location of the opening 44j. This engagement blocks movement of the second end portion 64 of the thread 60 through the opening 44j. The tether 60 can no longer extend, and thus limits movement of the first panel portion 12 away from the second panel portion 14.

Figure 5:
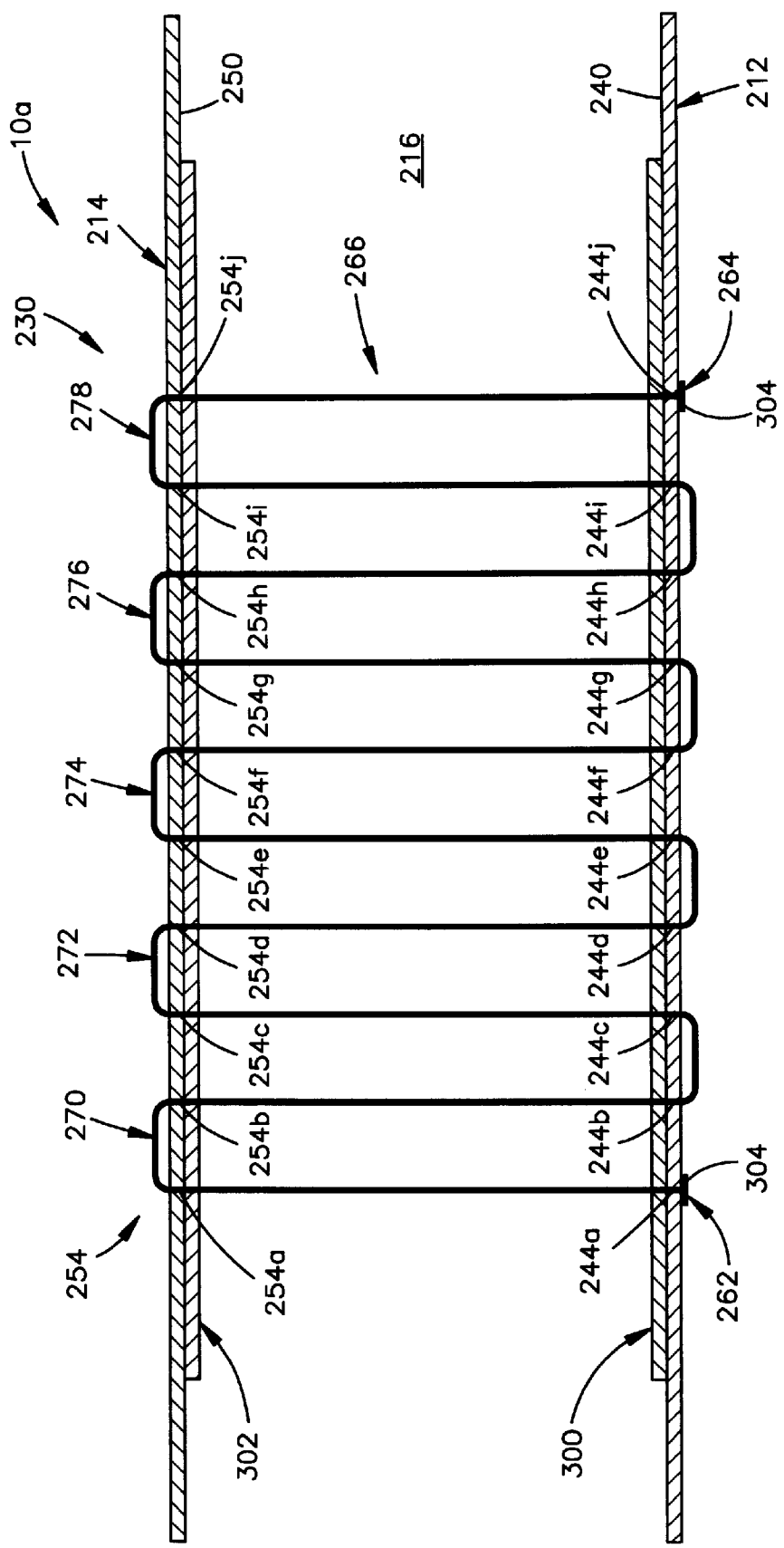
FIG. 5 is a view similar to FIG. 4 showing the tether of FIG. 4 in an extended condition.

FIGS. 4 and 5 illustrate portions of an air bag 10a in accordance with a second embodiment of the invention. The air bag 10a is similar in construction to the air bag 10 (FIGS. 1–3). Parts of the air bag 10a that are the same as or similar to, or that have the same function as, parts of the air bag 10 are given the same reference numerals with the prefix "2" attached.

The air bag 10a includes a tether 230 that is similar to the tether 30. The tether 230 comprises a single thread 260 that extends through a plurality of openings 244 in a first panel portion 212 and through a plurality of openings 254 in a second panel portion 214.

The air bag 10a includes two reinforcing panels 300 and 302. The reinforcing panel 300 is located on the inner side surface 240 of the first panel portion 212. The reinforcing panel 302 is located on the inner side surface 250 of the second panel portion 214.

When the thread 260 is first extended through the first and second panel portions 212 and 214, it is simultaneously extended through the first and second reinforcing panels 300 and 302. At that time, the needle that moves the thread 260 makes openings in the reinforcing panels 300 and 302 for the thread.

The tether 230 has different stop members than the stop members 120 and 122 of the tether 30. Specifically, the tether 230 includes stop members 304 on the end portions 262 and 264 of the thread 260 that are formed as knots tied in the end portions. The knots 304 are larger than the openings in the panel portions 212 and 214, so that the end portions 262 and 264 of the thread 260 can not be pulled through the openings.

When the air bag 10a is in the folded and deflated condition, as shown in FIG. 4, there is a substantial amount of slack in the part of the thread 260 disposed inside the inflation fluid volume 216 between the panel portions 212 and 214. This part of the thread 260 includes the legs of the loops 270–278. Thus, the legs of the loops 270–278 are relatively long. The thread 260 has minimal slack at the first end portion 262 and minimal slack at the second end portion 264. Substantially all the slack in the thread 260 is disposed between the first and second panel portions 212 and 214, within the inflation fluid volume 216, when the air bag 10a is in the deflated condition.

When the air bag 10a is inflated, the first and second panel portions 212 and 214 move away from each other, from the condition shown in FIG. 4 to the condition shown in FIG. 5. As this relative movement occurs, the tether 230 moves from the unextended condition shown in FIG. 4 to the extended condition shown in FIG. 5. Because the slack in the thread 260 is disposed in the inflation fluid volume 216, very little of the intermediate portion 266 of the tether 230 pulls through the openings 244 in the first panel portion 212 and through the openings 254 in the second panel portion 214. Thus, there is less friction between the thread 260 and the panel portions 212 and 214, as compared to the embodiment of FIGS. 1–3.

More than one tether may be included in an air bag such as the air bag 10. Tethers of a sufficient number and of appropriate dimensions may be used to tailor and control the shape of the inflated air bag. For example, FIG. 6 illustrates schematically a portion of an air bag 10a that includes two tethers 310 and 312 adjacent each other. Each one of the tethers 310 and 312 is constructed in accordance with one of the previously-described embodiments of the invention. A plurality of tethers may be used to strengthen the connection between the two panel portions, still allowing each individual tether to be formed as a single thread.

From the above description of the invention, those skilled in the art will perceive improvements, changes and modifications in the invention. For example, features from one embodiment may be combined with features from another embodiment, as suitable. Such improvements, changes and modifications within the skill of the art are intended to be covered by the appended claims.

Having described the invention, I claim:

1. An inflatable vehicle occupant protection device for helping to protect an occupant of a vehicle, said device being inflatable from a deflated condition to an inflated condition by inflation fluid from an inflation fluid source, said device comprising:

flexible material defining an inflation fluid volume for receiving inflation fluid, said material including a first panel portion and a second panel portion, said first panel portion having a plurality of discrete openings, said second panel portion having a plurality of discrete openings;

said first panel portion overlying said second panel portion when said device is in the deflated condition; and a tether interconnecting said first panel portion and said second panel portion, said tether including a single thread, said single thread extending through said plurality of openings in said first panel portion and through said plurality of openings in said second panel portion in a serpentine manner, said single thread having loop thread portions located outside said inflation fluid volume;

wherein said thread is tightly looped through said plurality of openings in said first panel portion and through said plurality of openings in said second panel portion, said thread having a first length of slack at a first end portion of said thread and a second length of slack at a second end portion of said thread when said device is in the deflated condition.

2. An inflatable vehicle occupant protection device for helping to protect an occupant of a vehicle, said device being inflatable from a deflated condition to an inflated condition by inflation fluid from an inflation fluid source, said device comprising;

flexible material defining an inflation fluid volume for receiving inflation fluid, said material including a first panel portion and a second panel portion, said first panel portion having a plurality of discrete openings, said second panel portion having a plurality of discrete openings; and a tether interconnecting said first panel portion and said second panel portion, said tether comprising a thread extending through said plurality of openings in said first panel portion and through said plurality of openings in said second panel portion to interconnect said first panel portion and said second panel portion;

said tether having a first end portion, an intermediate portion extending from said first end portion through said plurality of openings in said first and second panel portions, and a second end portion;

said first panel portion overlying said second panel portion when said device is in the deflated condition;

said first panel portion being spaced apart from said second panel portion when said device is in the inflated condition with said tether extending between said first and second panel portions to limit movement of said first panel portion away from said second panel portion;

said tether including a first stop member on said first end portion of said tether for blocking movement of said first end portion of said tether through said openings in said first and second panel portions upon movement of said first panel portion away from said second panel portion, and a second stop member on said second end portion of said tether for blocking movement of said second end portion of said tether through said openings in said first and second panel portions upon movement of said first panel portion away from said second panel portion;

said thread moving through said plurality of openings in said first panel portion and through said plurality of openings in said second panel portion upon movement of said first panel portion away from said second panel portion, the movement of said thread through said plurality of openings in said first panel portion being resisted by contact between said thread and the material of said first panel portion thereby slowing down the movement of said first panel portion away from said second panel portion, the movement of said thread through said plurality of openings in said second panel portion being resisted by contact between said thread and the material of said second panel portion thereby slowing down the movement of said first panel portion away from said second panel portion.

3. A protection device as set forth in claim 2 wherein said thread is tightly looped through said plurality of openings in said first panel portion and through said plurality of openings in said second panel portion, said thread having a first length of slack at said first end portion and a second length of slack at said second end portion when said device is in the deflated condition.

4. A protection device as set forth in claim 2 wherein substantially all the slack in said thread is disposed between said first and second panel portions when said device is in the deflated condition.

5. An inflatable vehicle occupant protection device for helping to protect an occupant of a vehicle, said device being inflatable from a deflated condition to an inflated condition by inflation fluid from an inflation fluid source, said device comprising;

flexible material defining an inflation fluid volume for receiving inflation fluid, said material including a first panel portion and a second panel portion, said first panel portion having a plurality of discrete openings, said second panel portion having a plurality of discrete openings; and a tether interconnecting said first panel portion and said second panel portion, said tether comprising a thread extending through said plurality of openings in said first panel portion and through said plurality of openings in said second panel portion to interconnect said first panel portion and said second panel portion;

said tether having a first end portion, an intermediate portion extending from said first end portion through said plurality of openings in said first and second panel portions, and a second end portion;

said first panel portion overlying said second panel portion when said device is in the deflated condition;

said first panel portion being spaced apart from said second panel portion when said device is in the inflated condition with said tether extending between said first and second panel portions to limit movement of said first panel portion away from said second panel portion;

said tether including a first stop member on said first end portion of said tether for blocking movement of said first end portion of said tether through said openings in said first and second panel portions upon movement of said first panel portion away from said second panel portion, and a second stop member on said second end portion of said tether for blocking movement of said second end portion of said tether through said openings in said first and second panel portions upon movement of said first panel portion away from said second panel portion; and said device further comprising a second tether adjacent said first tether, said second tether comprising a second thread extending through a second plurality of openings in said first panel portion and through a second plurality of openings in said second panel portion to interconnect said first panel portion and said second panel portion;

said second tether having a first end portion, an intermediate portion extending from said first end portion through said second pluralities of openings in said first and second panel portions, and a second end portion;

said first panel portion being spaced apart from said second panel portion when said device is in the inflated condition with said second tether extending between said first and second panel portions to limit movement of said first panel portion away from said second panel portion;

said second tether including a third stop member on said first end portion of said second tether for blocking movement of said first end portion of said second tether through said second plurality of openings in said first and second panel portions upon movement of said first panel portion away from said second panel portion, and a fourth stop member on said second end portion of said second tether for blocking movement of said second end portion of said second tether through said second plurality of openings in said first and second panel portions upon movement of said first panel portion away from said second panel portion.

6. An inflatable vehicle occupant protection device for helping to protect an occupant of a vehicle, said device being inflatable from a deflated condition to an inflated condition by inflation fluid from an inflation fluid source, said device comprising:

flexible material defining an inflation fluid volume for receiving inflation fluid, said material including a first panel portion and a second panel portion, said first panel portion having a plurality of discrete openings, said second panel portion having a plurality of discrete openings;

said first panel portion overlying said second panel portion when said device is in the deflated condition; and a tether interconnecting said first panel portion and said second panel portion, said tether including a single thread, said single thread extending through said plurality of openings in said first panel portion and through said plurality of openings in said second panel portion in a serpentine manner, said single thread having loop thread portions located outside said inflation fluid volume;

said loop thread portions defining loops, said loops being free of thread extending through the loops;

said first panel portion being spaced apart from said second panel portion when said device is in the inflated condition with said tether extending between said first and second panel portions to limit movement of said first panel portion away from said second panel portion;

said panel portions moving relative to said single thread as said device is inflated from the deflated condition to the inflated condition;

said thread having a first end portion disposed on a first side surface of said first panel portion;

said thread having an intermediate portion extending from said first end portion through, in sequence, a first one of said openings in said first panel portion, through a first one of said openings in said second panel portion, through a second one of said openings in said second panel portion, and through a second one of said openings in said first panel portion, said thread having a second end portion disposed on said first side surface of said first panel portion;

said first panel portion overlying said second panel portion when said device is in the deflated condition;

said first panel portion being spaced apart from said second panel portion when said device is in the inflated condition with said tether extending between said first and second panel portions to limit movement of said first panel portion away from said second panel portion, said tether including a first stop member on said first end portion of said tether for blocking movement of said first end portion of said tether through said openings in said first and second panel portions upon movement of said first panel portion away from said second panel portion, and a second stop member on said second end portion of said tether for blocking movement of said second end portion of said tether through said openings in said first and second panel portions upon movement of said first panel portion away from said second panel portion.

* * * * *